C. BROWN.
SPRAY PUMP.
APPLICATION FILED JUNE 24, 1916.

1,263,201.

Patented Apr. 16, 1918.

Witness
Eric Schinger
Edna K. Booth.

Inventor
Colin Brown
By Frank Keifer
Attorney

UNITED STATES PATENT OFFICE.

COLIN BROWN, OF ROCHESTER, NEW YORK.

SPRAY-PUMP.

1,263,201.  Specification of Letters Patent.  Patented Apr. 16, 1918.

Application filed June 24, 1916. Serial No. 105,646.

*To all whom it may concern:*

Be it known that I, COLIN BROWN, a citizen of the United States, residing at Rochester, in the county of Monroe and State of New York, have invented certain new and useful Improvements in Spray-Pumps, of which the following is a specification.

The object of this invention is to provide a hand spray pump which is double acting. This and other objects of the invention will be fully illustrated in the drawings, described in the specification and pointed out in the claims at the end thereof.

In the drawings.

In the drawings like reference numerals indicate like parts.

Figure 1:
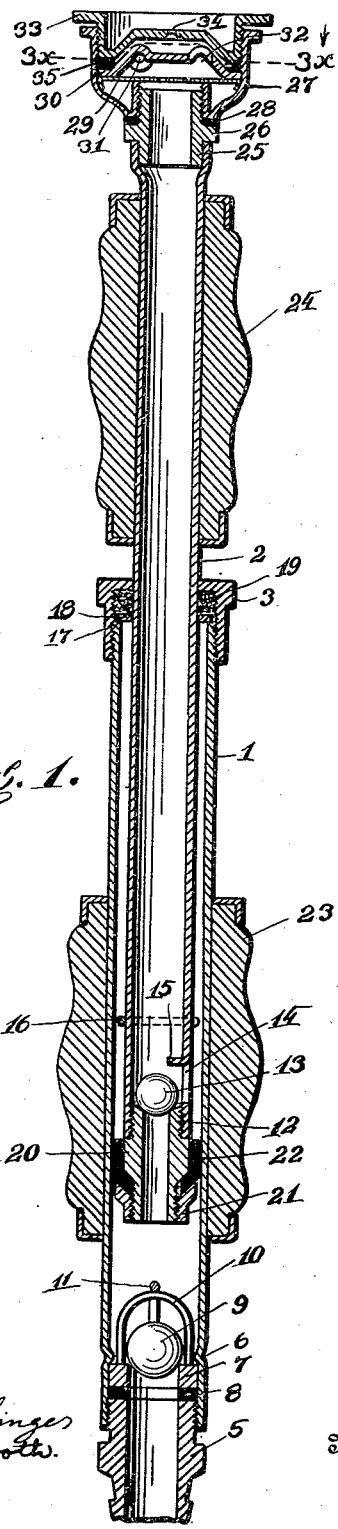
Figure 1 is a longitudinal section of my improved pump.
Figure 3:
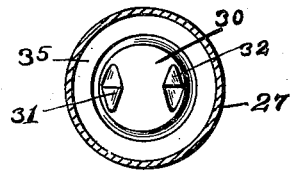
Fig. 3 is a horizontal section on the line 3×—3× of Fig. 1.
Figure 2:
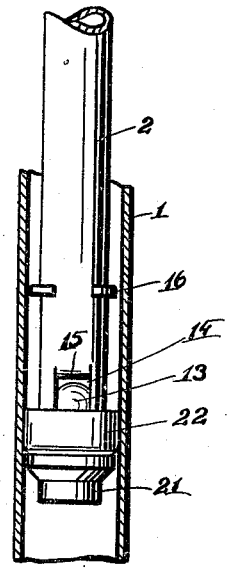
Fig. 2 is a side elevation of the lower end of the inner tube of the pump with the outer tube of the pump shown in longitudinal section.

As shown in the drawings the pump comprises an outer tube 1 of large diameter in which is mounted to slide an inner tube 2 of small diameter. A stuffing box 3 is provided at the upper end of the large tube through which the inner tube 2 passes and with which it forms a tight joint. At the lower end the outer tube 1 is provided with a female thread with which engages the nipple 5 to which the suction hose may be attached. Near the end of the tube the tube is spun out to form an inwardly projecting seat 6. Against this seat is pressed a ring 7, which ring is held in place by the nipple 5 with a washer 8 interposed between them. In the ring 7 is an opening which forms a seat for the ball valve 9 which valve is held in place by the wire arches 10 and 11 which form a cage encircling the ball.

On the lower end of the inner tube 2 is provided a female thread with which engages an extension tube 12. On the upper end of this tube is carried a ball 13 which forms a valve therewith. At the side of this ball the inner tube 2 is slit to form an opening 14, a portion of the tube 15 being bent inwardly into the tube to form a lip or guard by which the ball is held in place on or near its seat. Around the inner tube 2 is fastened a ring or flange 16, which ring is rigid with the tube and does not slide thereon.

The upper end of the outer tube 1 is cut away at 17 to form a seat for the washer 18 which engages therein and is carried thereby against the packing 19 which surrounds the inner tube 2. By means of this washer and the end of the tube 1, the packing is held firmly in place so that a tight joint between the inner and outer tubes is secured. When the outer tube 1 is detached from the stuffing box 3, the washer 18 follows the outer tube until it is disengaged therefrom by the flange 16 which holds it on the inner tube but leaves it exposed so that all the parts are accessible and can be easily cleaned.

The extension tube 12 is formed with a flange 20 thereon, the upper end of which is cut square and forms a shoulder that engages the lower end of the inner tube 2. The lower edge of the flange is beveled and the lower end of the extension tube is threaded to receive a nipple 21, which, at its upper end, has a funnel shaped flange, between which and the beveled end of the flange 20 is clamped a washer 22. This washer is cylindrical in shape at the top and funnel shaped at the bottom and because of its shape the washer can be made of ample size and has ample bearing surface on the side of the outer tube 1 so that the washer effectively packs the pump and is effectively engaged by the extension and nipple by which it is held in place in connection with the inner tube 2.

The washer 22 fits somewhat loosely between the outer tube and the valve support, so that as it moves down it will contract and permit the liquid to flow past it, thus helping to fill the annular space between the inner and outer tubes, the liquid flowing both past the washer 22 and through the valve 13. When it moves up it will expand and force all the liquid ahead of it. This causes the liquid contained in the annular space between the tubes to flow into the inner tube through the opening 14.

The outer tube is provided with a handle 23 and the inner tube is provided with a handle 24, which handles are rigidly fastened on their respective tubes and by which the tubes may be operated in and out in the pump operation.

Soldered to the upper end of the inner tube is a nipple 25 having a flange 26 thereon. The upper end of the nipple is threaded with a male thread. Fastened to the upper end of the nipple is a cup 27 which is provided with a female thread that engages with the male thread of the nipple 25. Between the lower end of the cup 27 and the flange 26 a washer 28 is compressed for the purpose of preventing leaking. Inside of the cup is provided a strainer 29, on top of which is provided a deflecting plate 30 in which are provided two tangential openings 31 and 32. At the top of the cup 27 is provided a cap 33 having an opening 34 therein through which the solution is ejected by the pump. This cap is provided with a flange around the upper edge thereof and the cylindrical part of it is threaded with a male thread which engages with a corresponding female thread in the cup by which the cap engages with the cup. Between the cap and the deflecting plate of the cup is provided a washer 35 by which a tight joint is made between the cap and the cup above the deflecting plate. The tangential openings 31 and 32 deflect the solution tangentially into the open space between the deflecting plate and the cap so that it has a swirling motion in this space between the plate and the cap. It will also be noticed that the lower end of the opening 34 is countersunk so that between the shape of the opening and the swirling motion of the solution, the solution emerges from the opening 34 in a cone shape spray instead of a needle like stream.

The operation of my pump is as follows:

When the inner tube moves upward in the outer tube the ball 13 remains on its seat and the liquid is drawn past the ball valve 9 so as to fill the outer tube. When the inner tube moves down the ball valve 9 closes and the ball valve 13 opens and the liquid passes this valve, part of it flowing up into the inner tube 2 and out of the nozzle and the rest of it passing through the opening 14 into the annular space in the outer tube 1 surrounding the inner tube 2. As the inner tube 2 moves up again the ball valve 13 closes and the ball valve 9 opens and the liquid is again drawn into the outer tube 1 and the liquid which is in the annular space surrounding the inner tube 2 is forced back through the opening 14 and up through the inner tube 2 and out at the nozzle.

It will be seen from the foregoing description that this pump acts as a double acting pump in that it will force the liquid out at the nozzle on both the upward and the downward movement of the inner tube.

It will be seen from the foregoing that all the parts of the pump are easily taken apart and that all of the parts are easily accessible for the purpose of cleaning. It will be understood that this pump is used for spraying solutions in which there is more or less sediment and it is necessary that the pump should keep itself free from clogging and should lend itself to easy cleaning whenever cleaning is needed and the construction of the pump is designed to secure both of these results.

I claim:

1. The combination of a pump, of an inner cylinder having a valve at the lower end thereof, an opening through the side of said cylinder immediately above said valve, a lip struck up from said cylinder and bent inwardly to form a guard above said valve for the purpose of holding it in place.

2. A pump having an outer and an inner cylinder, said cylinders being spaced from each other to form an intermediate chamber, a valve support at the bottom of the inner cylinder a valve, a flange formed around the outside of said support, said flange being beveled at the bottom, a washer having a cylindrical body surrounding the lower end of the inner cylinder, said washer being funnel shaped at one end to engage with said beveled flange, a nipple threaded on said valve support and having a funnel shaped flange at its upper end between which flange and the beveled flange on the support the funnel shaped end of the washer is clamped to hold the washer in place, said inner cylinder having an opening in its side above said valve for admitting liquid into the space between the two cylinders, and means for limiting the opening movement of said valve.

3. A spray pump having in combination inner and outer cylinders spaced from each other to form an intermediate chamber, said cylinders being reciprocable one relatively to the other and one of said cylinders having a spray nozzle on its outer end, a valve seat at the lower end of the inner cylinder, a valve engageable with said seat, a cup-washer on the lower end of the inner cylinder and forming the bottom of the chamber between the two cylinders, said inner cylinder having an opening in its side above the valve for connecting the inner cylinder with the space between the two cylinders, and said inner cylinder having means for limiting the opening movement of said valve.

In testimony whereof I affix my signature.

COLIN BROWN.

Copies of this patent may be obtained for five cents each, by addressing the "Commissioner of Patents, Washington, D. C."